United States Patent [19]

Eastlake, 3rd

[11] Patent Number: 5,568,554
[45] Date of Patent: Oct. 22, 1996

[54] METHOD FOR IMPROVING THE PROCESSING AND STORAGE PERFORMANCE OF DIGITAL SIGNATURE SCHEMES

[75] Inventor: Donald E. Eastlake, 3rd, Carlisle, Mass.

[73] Assignee: Digital Equipment Corporation, Maynard, Md.

[21] Appl. No.: 381,244

[22] Filed: Jan. 31, 1995

[51] Int. Cl.$^6$ .................................. H04L 9/00; H04L 9/30
[52] U.S. Cl. .................................. 380/25; 380/4; 380/23; 380/30; 380/49; 380/50
[58] Field of Search ........................... 380/4, 23, 24, 380/25, 30, 49, 50

[56] References Cited

U.S. PATENT DOCUMENTS

| | | | |
|---|---|---|---|
| 4,200,770 | 4/1980 | Hellman et al. | 380/30 |
| 4,206,315 | 6/1980 | Matyas et al. | 380/23 |
| 4,218,582 | 8/1980 | Hellman et al. | 380/30 |
| 4,218,738 | 8/1980 | Matyas et al. | 380/25 |
| 4,288,659 | 9/1981 | Atalla | 380/23 |
| 4,405,829 | 9/1983 | Rivest et al. | 380/30 |
| 4,424,414 | 1/1984 | Hellman et al. | 380/30 |

*Primary Examiner*—Bernarr E. Gregory
*Attorney, Agent, or Firm*—Kenneth F. Kozik

[57] ABSTRACT

A method of transferring data to insure data authenticity is provided comprising the steps of providing a first computer system, the first computer system having a mass storage device, a central processing unit having a encoding/decoding device, and a communication device, providing a second computer system, the second computer system having a mass storage device, a central processing unit having a encoding/decoding device, and a communication device, linking the first computer system to the second computer system via a network communications link, providing a database on the mass storage device of the first computer system, the database containing a plurality of records, selecting a subset of the plurality of records, encoding said subset into a signet, transferring the signet to the second computer system over the network communications link, transferring the subset to the second computer system over the network communications link, transferring the subset to the second computer system over the network communications link, decoding the signet in said the computer system, and verifying the decoded signet.

11 Claims, 7 Drawing Sheets

FIGURE 1

FIGURE 2 ENCRYPTER

FIGURE 3 DECRYPTER

FIGURE 4 ASA AUTHENTICATION

METHOD FOR IMPROVING THE PROCESSING AND STORAGE PERFORMANCE OF DIGITAL SIGNATURE SCHEMES

FIELD OF THE INVENTION

This invention relates to securing distributed database systems, and more particularly to a method of improving the processing and storage of distributed databases which utilize public key cryptography and digital signatures to insure authentication.

BACKGROUND OF THE INVENTION

When data is sent from a first computer system to a second computer system there arises a need to authenticate data. That is, the data received by the second system must be the same data that was sent from the first computer system.

In general, a user wishing to authenticate transmitted data may employ an encryption method, if the data is redundant in some fashion. The encryption method will commonly involve converting data (also referred to as plaintext or cleartext) on a sending system to an encrypted data (also referred to as cyphertext), sending the encrypted data to a receiving system, decrypting the encrypted data on a receiving system, and then checking the data. Thus, the sending system will typically include a encrypting device to encrypt the data or message, while the receiving system will include a decrypting device to decrypt the encrypted data. For digital systems, the message is defined to be a digital message, M, that is, a sequence of symbols form some alphabet. Generally, the alphabet is chosen to be the binary alphabet consisting of 0's and 1's.

Each encrypting device is an apparatus which accepts two inputs: a message M to be encrypted, and an encoding key or operator E. Each encrypting device transforms the message M in accordance with the encryption operator E to produce an encrypted version (i.e., ciphertext) C of the message M, where $C=E(M)$.

Each decrypting device is an apparatus which accepts two inputs: a ciphertext C to be decrypted, and a decrypting key or operator D. Each decrypting device transforms the ciphertext C in accordance with the decryption operator D to produce a decrypted version M' of the ciphertext C, where $M'=D(C)$, or $M'=D(E(M))$. The encrypting operator E and the decrypting operator D are selected so that $M'=M$ for all messages M'.

Threats to authenticity may include tampering and accidental destruction. Altering data in computer systems is analogous to jamming on communications channels. Accidental destruction refers to the unintentional overwriting or deletion of data.

Data authenticity requires that an individual not be able to substitute false ciphertext for an authentic ciphertext without detection. Formally, the two requirements are: (1) it should be computationally infeasible for an individual to systematically determine an encrypting transformation E given C, even if the corresponding plaintext M is known; and (2) it should be computationally infeasible for an individual to systematically find ciphertext C' such that D(C') is valid plaintext in the set M.

A number of cryptographic and decrypting techniques are readily available to provide authentication for digital communications. One example is the standards adopted by the National Bureau of standards in Federal Register, Mar. 17, 1975, Volume 40, No. 52 and Aug. 1, 1975, Volume 40, No. 149.

Another typical method described by Diffie and Hellman in "New Directions in Cryptography," IEEE Transactions on Information Theory (November 1976), is called a public key cryptosystem. In such a system, each user, e.g. user A, places in a public file an encrypting key $E_A$. User A keeps to himself the details of the corresponding decrypting key $D_A$ which satisfies the equation $D_A(E_A(M))=M$.

Another method is found in Rives et al. U.S. Pat. No. 4,405,829, issued on Sep. 20, 1983 (hereinafter "RSA"). Using the RSA method, a message M to be transferred is encrypted to ciphertext C by first encrypting the message M as a number N in a predetermined set, and then rasing the number N to a first predetermined power (associated with an intended receiver), and finally computing the remainder, or residue R, when the exponentiated number N is divided by the product of two predetermined prime numbers (associated with the intended receiver). The residue R is the ciphertext C. The ciphertext C is decrypted to the original message M at the decrypting terminal in a similar manner by raising the ciphertext C to a second predetermined power (associated with the intended receiver), and then computing the residue R', when the exponetiated ciphertext C is divided by the product of two predetermined prime numbers associated with the intended receiver. The residue R' corresponds to the original message M.

Current cryptosystems may also be applied to transferring individual records within databases from a sender to a receiver. A database is a collection of interrelated data on one or more mass storage devices. The collection is usually organized to facilitate efficient and accurate inquiry and update.

One such method maintains a digital signature of each record within a database. A digital signature is an encrypting of an item and typically is limited to 512 bytes, for example. Thus, in an exemplary database containing five records labeled R1, R2, R3, R4, and R5, this method stores a signature for each of the records, i.e., E(MD(R1)), E(MD(R2)), (MD(R3)), E(MD(R4), and (MD(R5)). "MD" represents a message digest. The message digest is produced when a hash function is applied to data, resulting in a unique representation that is usually smaller in size than the original text. With such a method, a receiver wishing to authenticate a record which was sent from a sender, R1 for example, would compare MD(R1) to D(E(MD(R1))), i.e., a decrypted form of E(MD(R1)), which would be accompanied by the transmission of E(MD(R1)). A disadvantage with such a method is that it requires the storage of both the records in the database and the signatures of each of the records.

In another method, a sender will maintain a signature of the entire database. For example, the sender will maintain a data structure E(MD(R1–R2+R3+R4+R5)). Thus, to authenticate the transfer of a single record from the sender to a receiver, R1 for example, the sender begins by sending R1, R2, R3, R4, R5, and E(MD(R1+R2+R3+R4+R5)) to the receiver. The receiver then compares the MD(R1+R2+R3 R4+R5)to D(E(MD(R1+R2+R3+R4+R5))) for authenticity. A disadvantage when such a system is that it requires the transmission of the entire database instead of just the record of records of interest.

In still another method, a message digest hierarchy is used to ensure authenticity. With such a method, a concatenated string of message digests and an encrypted form of the concatenated string of message digests are sent to a receiver. The process of concatenation is well known in the art. For example, in a database containing five records, i.e. R1, R2, R3, R4, and R5, two records R1 and R3 would be authenticated in the following manner. The sender would first construct a first string, i.e., MD(R1)+MD(R3). The sender would next construct a second string, i.e., E(MD(R1)+ MD(R3)). The sender would concatenate the first string and the second string and send to the receiver. The sender would next parse the string into [MD(R1)+MD(R3)] and [E(MD(R1)+MiD(R3))]. The process of parsing a string is well known in the art. Lastly, the receiver would de-encrypt E(MD(R1)+MD(R3)), parse the message digests, and compare the resulting message digests for authenticity. A disadvantage with this method is again the bulky aggregate of message digests and signatures.

A method of improving the processing and storage performance of digital signature schemes is desired.

SUMMARY OF THE INVENTION

In accordance with the present invention, a method of transferring data to insure data authenticity is provided comprising the steps of providing a first computer system, the first computer system having a mass storage device, a central processing unit having a encypting/decrypting device, and a communication device, providing a second computer system, the second computer system having a mass storage device, a central processing unit having a encypting/decrypting device, and a communication device, linking the first computer system to the second computer system via a network communications link, providing a database on the mass storage device of the first computer system, the database containing a plurality of records, selecting a subset of the plurality of records, encrypting said subset into a signet, transferring the signet to the second computer system over the network communications link, transferring the subset to the second computer system over the network communications link, transferring the subset to the second computer system over the network communications link, decrypting the signet in said the computer system, and verifying the decrypted signet. With such an arrangement, data integrity is insured during its transfer from the first system to the second system.

BRIEF DESCRIPTION OF THE DRAWINGS

The novel features believed characteristic of the invention are set forth in the appended claims. The invention itself, however, as well as other features and advantages there of, will be best understood by reference to the detailed description of specific embodiments which follows, when read in conjunction with the accompanying drawings, wherein:

DETAILED DESCRIPTION

Figure 1:
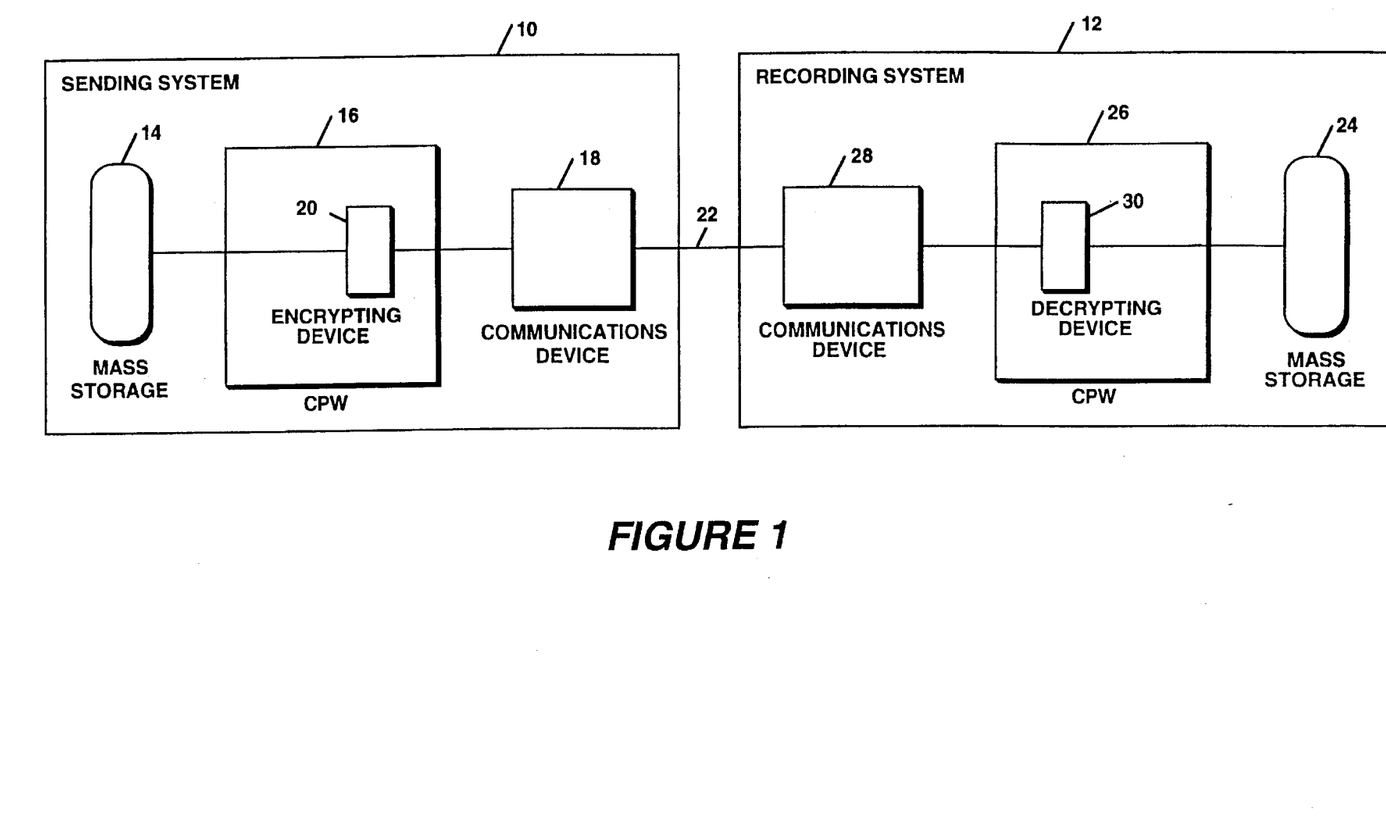
FIG. 1 is a block diagram of an exemplary distributed computer system showing the transfer of data.

Referring to FIG. 1, a block diagram of an exemplary secure distributed computer system is shown to have two computer systems labeled 10 and 12, respectively. Computer system 10, also referred to as a sending system, is shown to include a mass storage device 14, a central process unit (CPU) 16, and a communications device 18. The mass storage device 14 provides storage for a plurality of databases. The CPU 16 contains an encrypting/decrypting device 20 which is used to encrypt text into ciphertext and decrypt ciphertext into text. The communications device 18 provides a means for the sending system 10 to send and receive data to the receiving system 12 over a network communications link 22.

Computer system 12, also referred to as a receiving system, is shown to include a mass storage device 24, a central process unit (CPU) 26, and a communications device 28. The mass storage device 24 provides storage for a plurality of databases. The CPU 26 contains an encrypting/decrypting device 30 which is used to encrypt text into ciphertext and decrypt ciphertext into text. The communications device 28 provides a means for the receiving system 12 to send and receive data over the network communications link 22.

By way of example, a user wishing to transmit text from the sending system 10 to the receiving system 12 will request the CPU 16 to access the selected text from mass storage device 14. The selected text will pass into the CPU 16, through the encrypting device 20, and out to the communications device 18. The communications device 18 will transmit the text over the network communications link 22 to the communications device 28. The communications device 28 will pass the text through the decrypting device 30 of the CPU 26 and store the text in the mass storage device 24.

Figure 2:
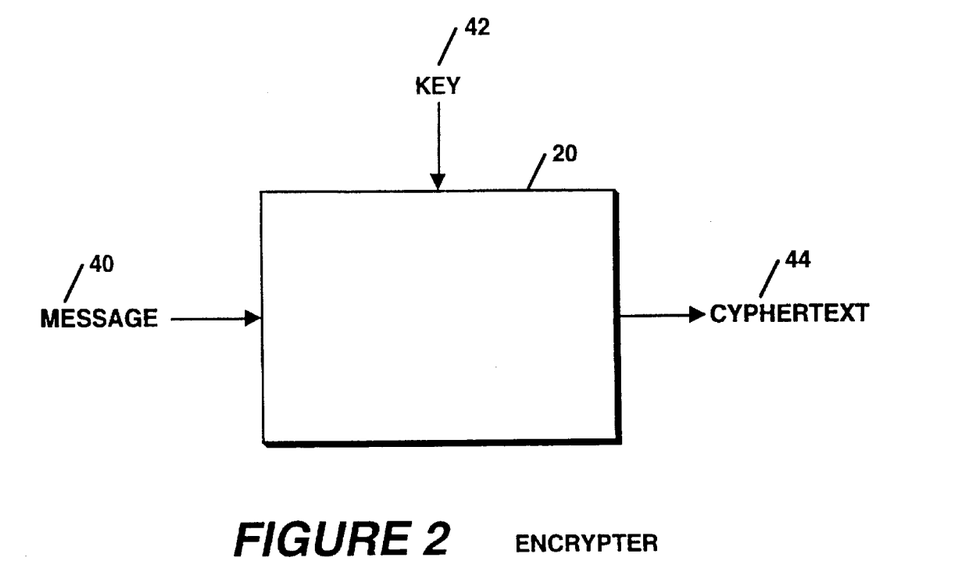
FIG. 2 is a block diagram of the exemplary encrypter of FIG. 1.

Referring to FIG. 2, the encrypting device 20 of FIG. 1 is shown in more detail. The text to be transmitted, also known as a message 40, is passed to the encrypting device 20. While in the encrypting device 20, a key 42 is applied to the message 40. Upon application of the key 42 to the message 40 an encrypted message 44 (also known as ciphertext) is produced. The ciphertext 44 is then transmitted to the receiving system 12 (of FIG. 1) over the network communications link 22.

Figure 3:
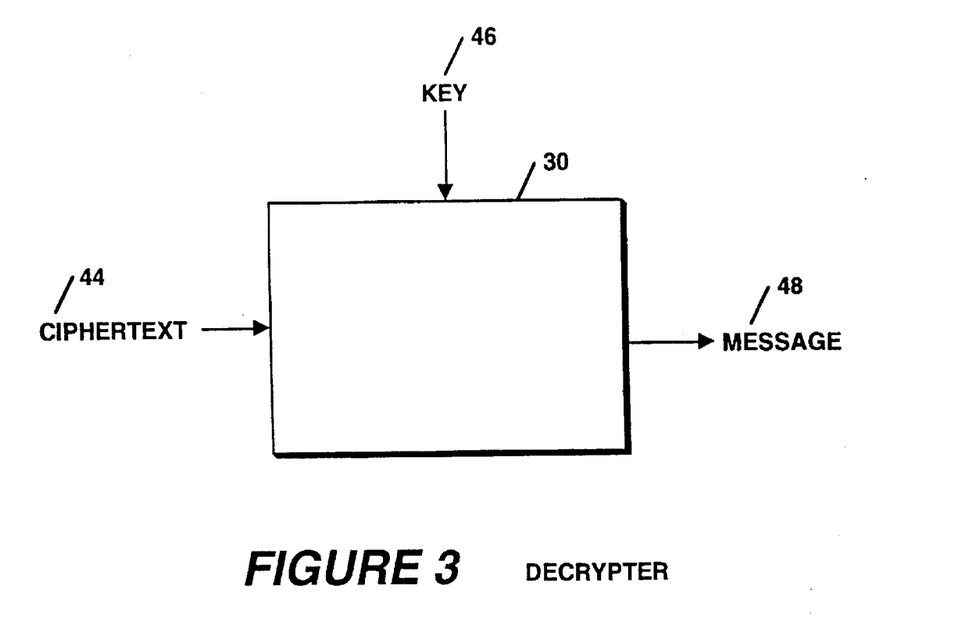
FIG. 3 is a block diagram of the exemplary decrypter of FIG. 1.

Referring to FIG. 3, the decrypting device 30 of FIG. 1 is shown in more detail. The ciphertext 44 which is received from the sending system 10 is passed into the decrypting device 30. While in the decrypting device 30, a key 46 is applied to the ciphertext 44. Upon application of the key 46 to the ciphertext 44 a decrypted message 48 is produced. The decrypted message 48 is thus the original message 40.

Figure 4:
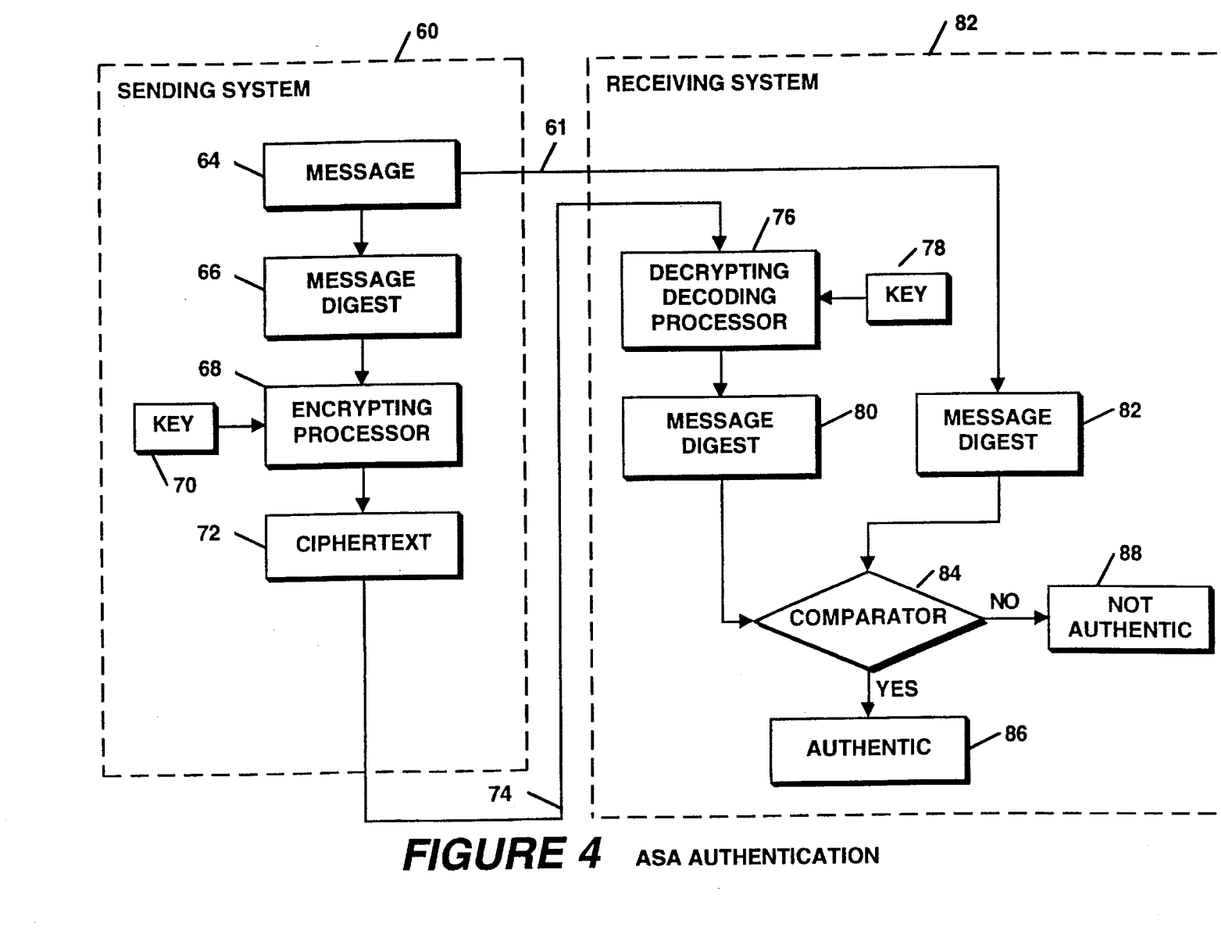
FIG. 4 is a flow diagram of an authentication method using RSA and message digest hierarchy.

As previously mentioned, a user wishing to insure that transferred messages be authenticate may use one of several traditional methods. Referring to FIG. 4, a block diagram of a distributed computer system in which data is authenticated using the RSA method is shown to include a sending system 60 and a receiving system 62. A message 64, for example, R1, is sent by the sending system 60 to the receiving system 62 over a network communications link 61. The message 64 is also converted to a message digest 66, e.g., MD(R1) The message digest ("MD") 66 is passed to an encrypting device 68. A key 70 is then applied to the message digest 66 in the encrypting device 68 and results in the production of a ciphertext 72, e.g., E(MD(R1)). The ciphertext 72 is sent via a network communications link to a decrypting device 76 in the receiving system 62. While in the decrypting device 76, a key 78 is applied to the ciphertext 72 and results in the production of a message digest 80, e.g., D(E(MD(R1))) or MD(R1)'. The original message 64 is converted to a message digest 82, MD(R1). The message digest 80, MD(R1)' and the message digest 82, MD(R1) are then passed to a comparator 84. While in the comparator 84, if the message digest 80 and the message digest 82 are equivalent, i.e., MD(R1)=MD(R1)', then the message is authentic 86. If the message digest 80 and the message digest 82 are not equivalent, i.e., MD(R1)≠MD(R1)', then the message is not authentic 88.

Figure 5:
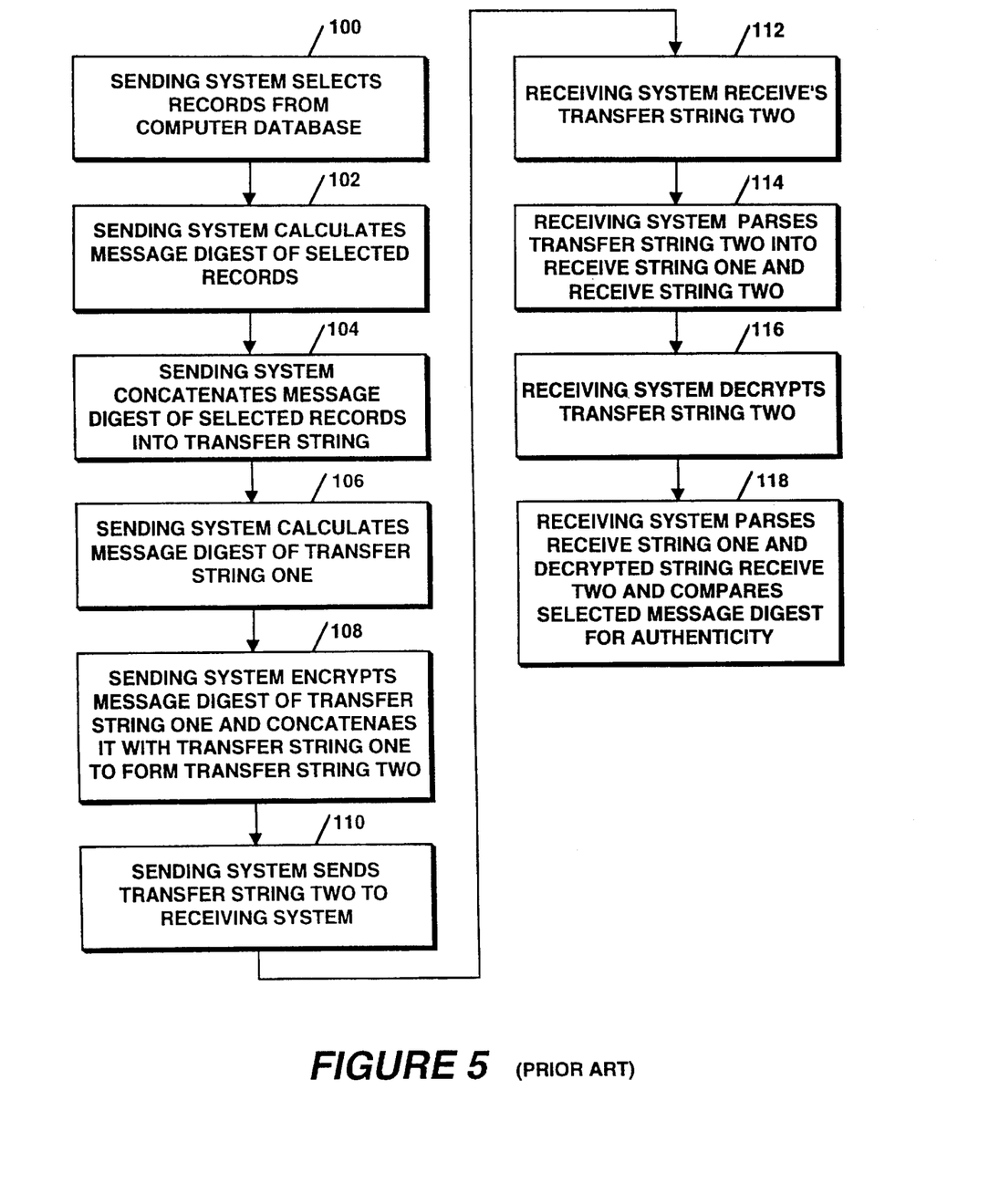
FIG. 5 is an alternate flow diagram of the authentication method using RSA and message digest hierarchy of FIG. 4.

As mentioned previously, traditional methods of transferring individual records within in single database have used RSA in a manner previously described as a message digest hierarchy. Referring to FIG. 5, a flow chart of an exemplary RSA message digest hierarchy system begins at step 100 where a sending system selects records from a computer database which will be transferred to a receiving system. For example, R1 and R2. At step 102, the sending system calculates a message digest of each of the selected records, i.e., MD(R1) and MD(R2). At step 104, the sending system concatenates each of the message digests produced at step 102 into a first transfer string, i.e., (MD(R1)+MD(R2)). At step 106 the sending system calculates a message digest of the first transfer string, i.e., MD(MD(R1)+MD(R2)). At step 108 the sending system encrypts the message digest of the first transfer string and concatenates it with the first transfer string, thus producing a second transfer string, i.e., [(MD(R1)+MD(R2))+E(MD(MD(R1)+MD(R2)))]. At step 110, the sending system sends the second transfer string to the receiving system.

At step 112, the receiving system receives the second transfer string from the sending system over a communications link. At step 114, the receiving system parses the second transfer string into two receiving strings, i.e., a first received string, i.e., (MD(R1)+MD(R2)), and a second received string, i.e., E(MD(MD(R1)+MD(R2))). At step 116, the receiving system decrypts the second received string, i.e., D(E(MD(MD(R1)+MD(R2)))), and the receiver calculates MD(R1) at step 117. At step 118, the receiving system calculates a message digest of the first receive string and compares it with the decrypted second receive string. Thus, if MD(MD(R1)+MD(R2)) equals D(E(MD(MD(R1)+MD(R2)))), i.e., MD(R1) received equals MD(R1) calculated, the record R1 is authentic.

Figure 6:
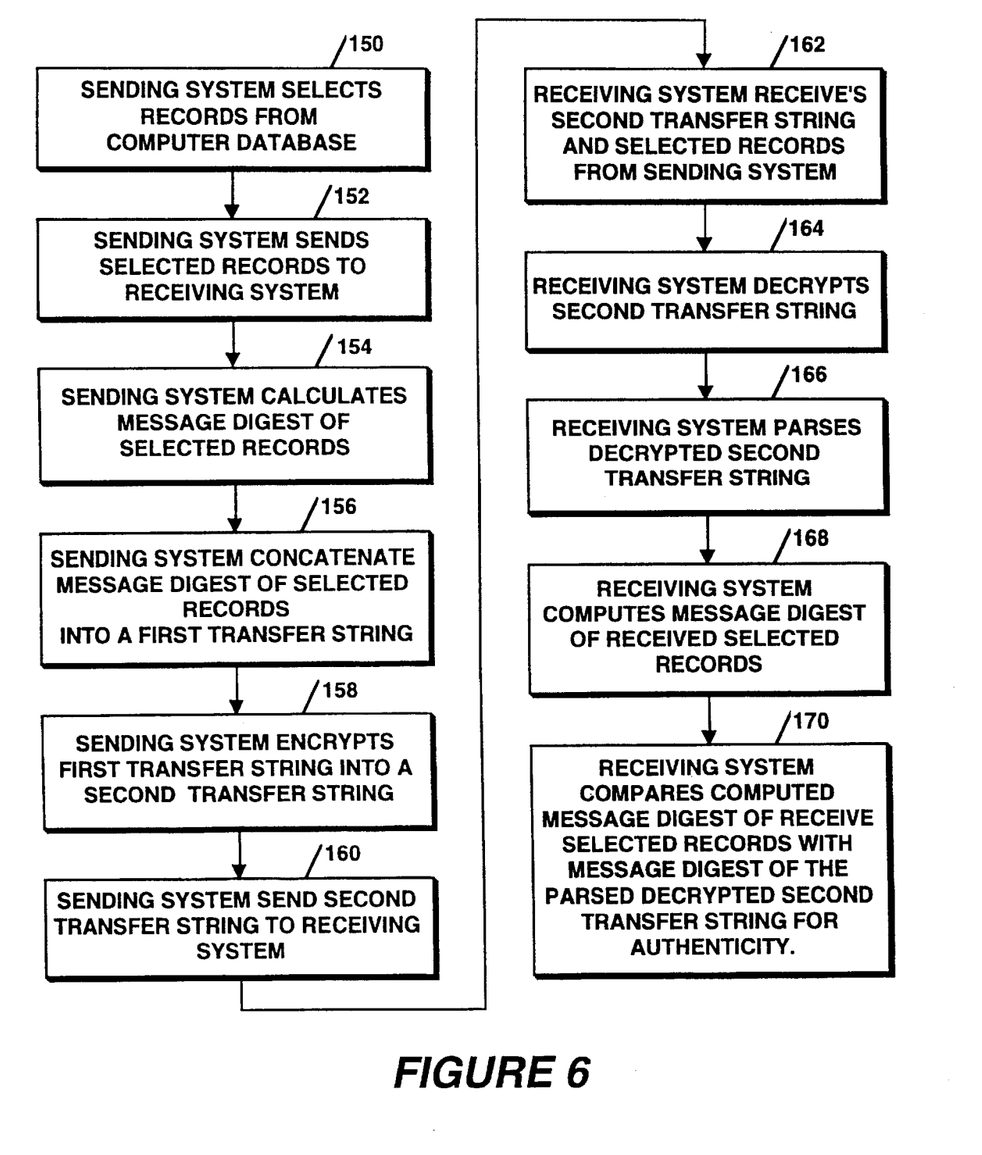
FIG. 6 is a flow diagram of an authentication method using RSA according to a first embodiment of the present invention.

Referring to FIG. 6, a flow chart of a RSA method of digital signature schemes is shown according to a first embodiment of the present invention. At step 150, the sending system selects records to be sent to the receiving system from a computer database. At step 152, the sending system sends the selected records to the receiving system over a network communications link. For example, records R1 and R2. At step 154, the sending system calculates a message digest of each of the selected records from the computer database, i.e., MD(R1) and MD(R2). At step 156, the sending system concatenates the messages digests of each of the selected records into a first transfer string, i.e., MD(R1)+MD(R2). The sending system then, at step 158, encrypts the first transfer string into a signet, i.e., E(MD(R1)+MD(R2)). At step 160, the sending system sends the signet to the receiving system. The receiving system then begin processing at step 162 by receiving the signet and the selected records from the sending system via the network communications link. At step 164, the receiving system decrypts the signet, i.e. D(E(MD(R1)+MD(R2))), At step 166, the receiving system parses the decrypted signet into individual message digests of the selected records, i.e., MD(R1)' and MD(R2)'. At step 168, the receiving system computes a message digest of each of the received selected records, i.e., MD(R1) and MD(R2). At step 170, the receiving system compares the computed message digests of the receive selected records with the message digests of the parsed decrypted signet for authenticity. For example, if MD(R1) equals MD(R1)∝0 then record R1 is authentic.

Figure 7:
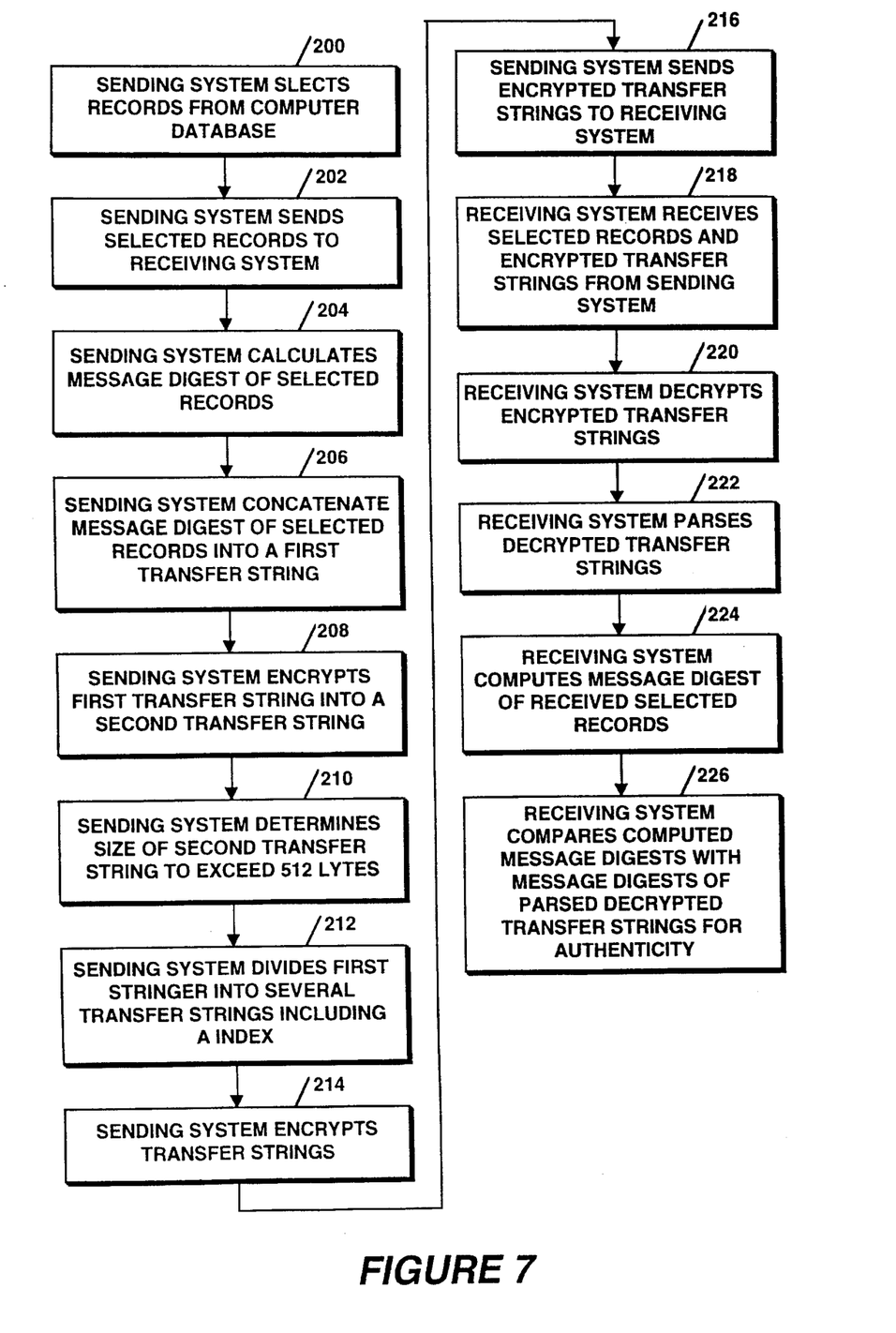
FIG. 7 is a flow diagram of an authentication method using RSA according to a second embodiment of the present invention.

Referring to FIG. 7, a flow chart of a RSA method of digital signature schemes is shown according to a second embodiment of the present invention. Processing begins in a sending system at step 200 when the sending system records from a computer database; for example, records R1, R2, R3, and R4. At step 202, the sending system sends the selected records from the computer database to a receiving system over a network communications link. At step 204, the sending system calculates a message digest of each of the selected records, i.e., MD(R1), MD(R2), MD(R3), and MD(R4). At step 206, the sending system concatenates the message digests of the selected records into a first transfer string, i.e., MD(R1)+MD(R2)+MD(R3)+MD(R4). At step 208, the sending system encrypts the first transfer string, producing a second transfer string, i.e., E(MD(R1)+MD(R2)+MD(R3)+MD(R4)). At step 210, the sending system determines whether the second transfer string exceeds 512 bytes. If the second transfer string exceeds a desired size, 512 bytes, for example, the sending system at step 212 divides the first transfer string into small segments and maintains an index as to the number of segments produced. For example, if two segments are produced, then the sending system produces two indices, i.e., 1 of 2, and 2 of 2. At step 214, the sending system concatenates the appropriate index to the segment and encrypts each of the segments. In the present example, segment one may consist of E(MD(R1)+MD(R2)+1/1), and segment two may consist of E(MD(R1)+MD(R2)+2/2). At step 216, the sending system sends the encrypted segments, also referred to as a signet, to the receiving system over the network communications link.

Processing in the receiving system begins at step 218 when the receiving system receives the selected records and the encypted segments from the sending system. At step 220, the receiving system decrypts the segments, i.e., D(E(MD(R1)+MD(R2)+1/2)) and D(E(MD(R1)+MD(R2)+2/2)). At step 222, the receiving system parses the decrypted segments and verifies the correct number of segments were received by checking the indices, resulting in MD(R1)', MD(R2)', MD(R3)', and MD(R4)'. At step 224, the receiving system computes a message digest for each of the receive selected records. At step 226, the receiving system compares the computed message digests with the corresponding massage digests of the parsed decrypted segments for authenticity. For example, if MD(R1) equals MD(R1)' then record R1 is authentic.

Figure 8:
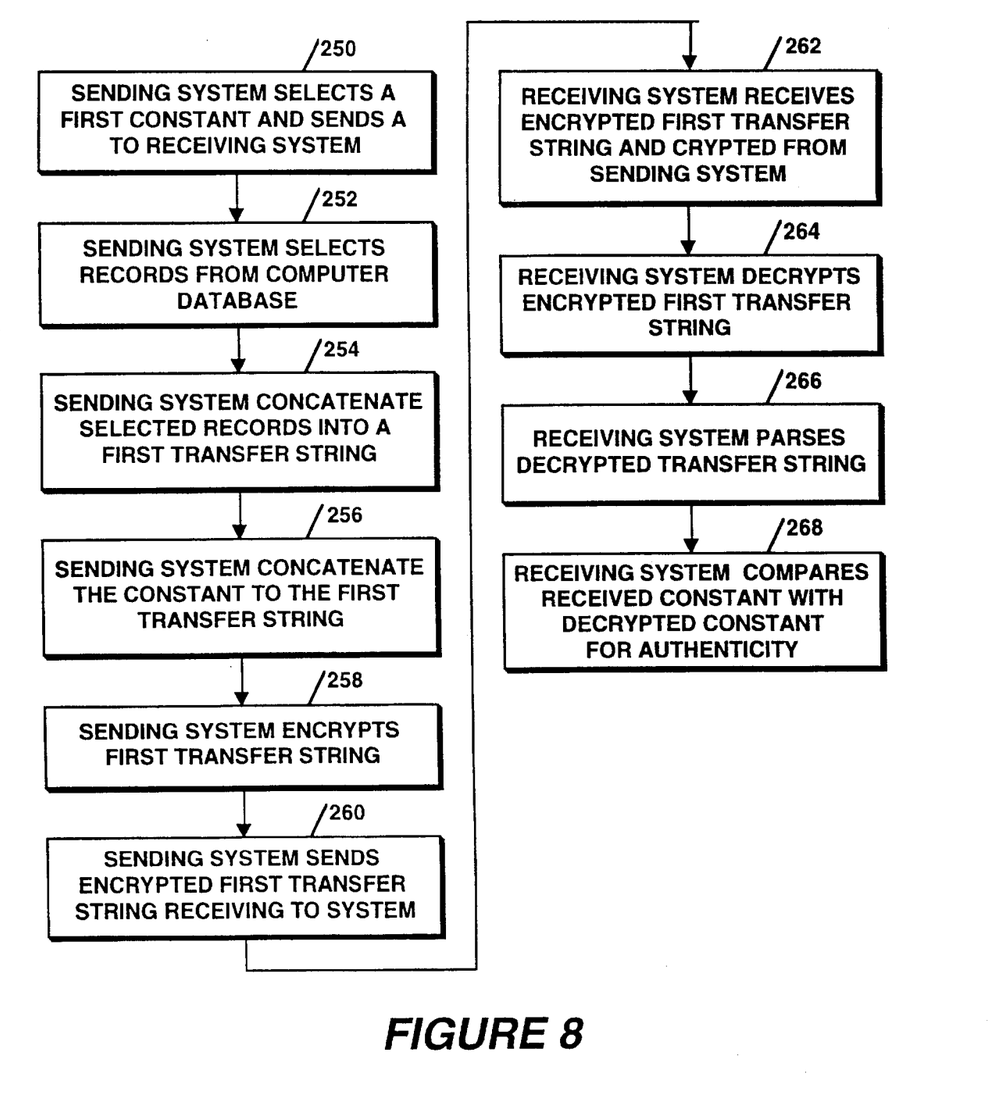
FIG. 8 is a flow diagram of an authentication method using RSA according to a first embodiment of the present invention.

Referring to FIG. 8, a flow chart of a RSA method of digital signature schemes is shown according to a third embodiment of the present invention. Processing in a sending system begins at step 250 when the sending system selects a first constant, C, for example, and sends it to a receiving system over a network communications link. At step 252, the sending system selects records from a computer database, R1 and R2, for example, and determines that the size of the individual selected records is small enough to avoid the computation of message digests before encrypting. At step 254, the sending system concatenates the selected records into a first transfer string, i.e., 111+112. At step 256, the sending system concatenates the constant to the first transfer string to produce R1+R2+C. At step 258, the sending system encodes the first transfer string to produce E(R1+R2+C) (also known as a signet). At step 260, the sending system sends the signet to the receiving system over the network communications link.

Processing in the receiving system begins at step 262 when the receiving system receives the signet and the constant from the sending system over the network communications link. At step 264, the receiving system decrypts the signet, i.e., D(E(R1+R2+C)). At step 266, the receiving system parses the decrypted signet and extracts the constant, i.e. C'. At step 268, the receiving system compares the received constant C with the decrypted constant C' for authenticity. If C=C' then the records are authentic, i.e., no one has tampered with the selected records when they were transferred from the sending system to the receiving system.

Having described preferred embodiments of the invention, it will now become apparent, to one of skill in the art that other embodiments incorporating its concepts may be used. It is felt therefore, that these embodiments should not be limited to the disclosed embodiments, but rather should be limited only by the spirit and scope of the appended claims.

What is claimed is:

1. A method of transferring data to insure data authenticity comprising the steps of:

providing a first computer system, said first computer system having a mass storage device, a central processing unit having an encrypting/decrypting device, and a communication device;

providing a second computer system, said second computer system having a mass storage device, a central processing unit having an encrypting/decrypting device, and a communication device;

linking said first computer system to said second computer system via a network communications link;

providing a database on said mass storage device of said first computer system, said database containing a plurality of records;

selecting a subset of said plurality of records;

encrypting said subset into a signet, said encrypting including the substeps of calculating a message digest for each of the records in said subset, concatenating each of said message digests into a first transfer string, and encrypting said first transfer string using a first key;

transferring said signet to said second computer system over said network communications link;

transferring said subset to said second computer system over said network communications link;

decrypting said signet in said second computer system; and verifying said decrypted signet.

2. The method of transferring data to insure data authenticity according to claim 1 wherein the step of decrypting said signet comprises the steps of:

applying a second key to said signet to produce a string of message digests; and parsing said string of message digest into a plurality of individual message digests.

3. The method of transferring data to insure data authenticity according to claim 2 wherein the step of verifying said decrypted signet comprises the steps of:

computing a message digest for each of the records in said subset;

comparing the message digest for each of the records in said subset with its corresponding parsed individual message digest; and signaling a message authentication in said corresponding message digests are equivalent.

4. The method of transferring data to insure data authenticity according to claim 2 wherein the step of verifying said decrypted signet comprises the steps of:

comparing said second constant to said third constant; and signaling a message authentication if said second constant equals said third constant.

5. The method of transferring data to insure data authenticity according to claim 1 wherein the step of decrypting said signet comprises the steps of:

parsing said signet to produce a second constant and an encrypted second transfer string; and applying a second key to said encrypted second transfer string to produce a third constant and a string of records.

6. A method of transferring data to insure data authenticity comprising the steps of:

providing a first computer system, said first computer system having a mass storage device, a central processing unit having an encrypting/device, and a communication device;

providing a second computer system, said second computer system having a mass storage device, a central processing unit having an encrypting/decrypting device, and a communication device;

linking said first computer system to said second computer system via a network communications link;

providing a database on said mass storage device of said first computer system, said database containing a plurality of records;

selecting a first subset of said plurality of records;

indexing said first subset into a plurality of indexed subsets;

converting said plurality of indexed subsets into a signet;

transferring said signet and said index to said second computer system over said network communications link;

transferring said first subset to said second computer system over said network communications link;

decrypting said signet in said second computer system; and verifying said decrypted signet.

7. The method of transferring data to insure data authenticity according to claim 6 wherein the step of indexing said first subset into a plurality of indexed subsets comprises the steps of:

dividing the said first subset into a plurality of smaller subsets;

providing a plurality of numbers, beginning with one, incremented by one, for each of said equally-sized smaller subsets; and concatenating each of said numbers with its corresponding smaller subsets.

8. The method of transferring data to insure data authenticity according to claim 7 wherein the step of converting said plurality indexed subsets into a signet comprises the steps of:

calculating a message digest for each of the records in said indexed subsets;

concatenating each of said message digests into a plurality of transfer strings;

concatenating each of said numbers to said associated transfer strings; encrypting said transfer strings using a first key; and concatenating said encrypted transfer strings.

9. The method of transferring data to insure data authenticity according to claim 8 wherein the step of decrypting said signet comprises the steps of:

applying a second key to said signet to produce a string of message digests; and parsing said string of message digests into a plurality of individual message digests and an associated index.

10. The method of transferring data to insure data authenticity according to claim 9 wherein the step of verifying said decrypted signet comprises the steps of:

computing a message digest for each of the records in said subset;

comparing the message digest for each of the records in said subset with its corresponding parsed individual message digest; and signaling a message authentication in said corresponding message digests are equivalent.

11. A method of transferring data to insure data authenticity comprising the steps of:

providing a first computer system, said first computer system having a mass storage device, a central processing unit having an encrypting/decrypting device, and a communication device;

providing a second computer system, said second computer system having a mass storage device, a central processing unit having an encrypting/decrypting device, and a communication device;

linking said first computer system to said second computer system via a network communications link;

providing a database on said mass storage device of said first computer system, said database containing a plurality of records;

selecting a subset of said plurality of records;

converting said subset into a signet, the step of converting including the substeps of providing a first constant, concatenating each of said records in said subset a first transfer string, concatenating said first constant into said first transfer string, encrypting said first transfer string using a first key, and concatenating said encrypted first transfer string to said first constant;

transferring said signet to said second computer system over said network communications link;

transferring said subset to said second computer system over said network communications link;

decrypting said signet in said second computer system; and verifying said decrypted signet.

* * * * *